(12) United States Patent
Savås

(10) Patent No.: US 6,336,670 B1
(45) Date of Patent: Jan. 8, 2002

(54) LOAD PROTECTION DEVICE

(76) Inventor: Gunnar Savås, Skeviksstrandsvägen 32, Gustavsberg (SE), 134 32

( * ) Notice: Subject to any disclaimer, the term of this patent is extended or adjusted under 35 U.S.C. 154(b) by 0 days.

(21) Appl. No.: 09/674,287

(22) PCT Filed: Apr. 20, 1999

(86) PCT No.: PCT/SE99/00628

§ 371 Date: Oct. 30, 2000

§ 102(e) Date: Oct. 30, 2000

(87) PCT Pub. No.: WO99/58369

PCT Pub. Date: Nov. 18, 1999

(30) Foreign Application Priority Data

Apr. 29, 1998 (SE) .............................................. 9801506

(51) Int. Cl.⁷ .................................................. B60R 5/04
(52) U.S. Cl. .................................. 296/37.16; 296/24.1
(58) Field of Search ........................... 296/37.16, 37.15, 296/37.8, 37.5, 24.1, 69

(56) References Cited

U.S. PATENT DOCUMENTS

| | | | | |
|---|---|---|---|---|
| 4,979,772 A | * | 12/1990 | Carey et al. | ............... 296/69 X |
| 5,702,143 A | * | 12/1997 | Shimazaki | ................. 296/24.1 |
| 5,716,091 A | * | 2/1998 | Wieczorek | ............... 296/37.16 |

FOREIGN PATENT DOCUMENTS

| | | | | |
|---|---|---|---|---|
| DE | 38 27 358 | | 2/1990 | |
| DE | 3909397 | * | 10/1990 | .............. 296/37.16 |
| DE | 41 28 554 | | 3/1992 | |
| DE | 42 02 103 | | 8/1992 | |
| DE | 43 01 398 | | 7/1994 | |
| DE | 196 05 907 | | 8/1997 | |
| JP | 24640 | * | 10/1990 | .............. 296/37.16 |
| SE | 503 377 | | 6/1996 | |

* cited by examiner

Primary Examiner—Joseph D. Pape
(74) Attorney, Agent, or Firm—Jacobson Holman, PLLC

(57) ABSTRACT

A load containment arrangement for a car that includes a load containment barrier (5) which is connected to the upper edge (29) of the backrest (21) of the rear seat (2) through the medium of a pivot or hinge (6) that has a horizontal axle which extends transversely to the longitudinal direction of the car A link arm (7) is connected at one end-part (71) to the barrier (5) with a pivot or hinge (8) in a position between the upper and lower edges (51, 52) of the barrier, and with its other end-part (72) to a fixed point (9) in the car at a pivot or hinge positioned between the upstanding backrests of respective front and rear seats (1, 2), and in the proximity of the floor (32) of the car interior, whereby the barrier (5) is moved forcibly from its position behind the rear seat backrest (21) to a position at the forward end of said baggage space area when the rear seat backrest (21) is folded forwardly downwards, and vice versa

19 Claims, 1 Drawing Sheet

LOAD PROTECTION DEVICE

BACKGROUND OF THE INVENTION

1. Field of the Invention

The present invention relates to a load containment arrangement for a car that includes a rear seat and a baggage space located behind the rear seat, in which a load containment barrier is positioned behind the backrest of the rear seat and extends up from the floor of the baggage space, and in which the backrest of the rear seat can be folded or dropped down so as to forwardly extend the baggage space.

2. Description of the Related Art

In the case of so-called estate cars or semi-estate cars, the backrest of the rear seat can be dropped forwards so that the rear side of the backrest will lie horizontally and therewith form a forward extension of the floor surface of the standard baggage space behind the rear seat. Normally, the seat cushion of the rear seat is first swung up about an axle positioned beneath the seat cushion and in the proximity of its front edge, whereafter the backrest of the rear seat is dropped to the position previously occupied by the seat cushion.

With the intention of improving load containment at the front edge of the forwardly extended baggage space, it is known to mount a load containment barrier on the upper edge of the backrest of the rear seating, so as to enable the barrier to be positioned essentially vertically when the rear seat has been dropped down, and then connect the upper edge of the barrier to the safety belts of the rear seating. Alternatively, the safety belts of the rear seating can be coupled to the upper edge of the forwardly dropped rear seat cushion.

One problem with the known abutment system is that it only enables the car user to establish reinforced load containment at the front edge of the baggage space concerned, said construction thus permitting the car user to refrain from utilising this facility or forgetting to utilise the same.

SUMMARY OF THE INVENTION

Accordingly, an object of the present invention is to provide a protective arrangement that includes a load containment barrier that is moved forcibly from a correct first position behind the rear seat backrest, in which the backrest when upstanding forms a forward limitation of the "normal" baggage space in the car, to a correct second position in front of the forwardly increased baggage-space that has been created by folding down the backrest of the rear seat, and back again.

According to the invention, the barrier is pivotally connected to the upper edge of the backrest of the rear seat and also approximately midway of its height to one end of a link arm whose other end is pivotally connected to the car chassis between the backrest of the front seat and the rear seat so as to form a mechanism that includes three links and four pivots with which the barrier is forcibly moved to a respective correct position in both respective end positions of the backrest of the rear seat, i.e. both when the backrest is upright and forwardly horizontal.

In preferred embodiments, the safety belts of the rear seating are connected to the upper edge regions of the load containment barrier when the barrier is in its forward end position. When the backrest of the rear seat is divided into two parts that can be dropped and raised independently of each other, the load containment barrier may be correspondingly divided, wherewith a particular advantage lies in the fact that the boundary line between the partition line of the barrier and the backrest is laterally offset in relation to the gap between the front seats such as to screen-off the gap when the broader part of the backrest of the rear seat is dropped down to extend the baggage space area. The arrangement may, of course, include catches for latching both parts of the barrier. A link mechanism is suitably provided at each side edge of the load containment barrier/rear seat backrest.

Further, similar link mechanisms may be connected to the side edges of the barrier/backrest that lie mutually adjacent when the backrest is divided.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
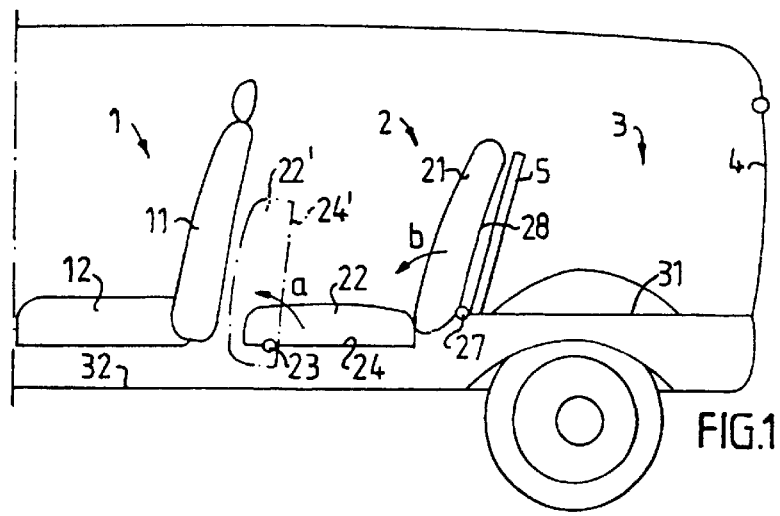
FIG. 1 is a schematic vertical sectional view of an estate car that includes a load containment barrier immediately behind the backrest of the rear seat.

FIG. 1 is a schematic sectional view of part of an estate car that has a front seat 1, a rear seat 2, a baggage space 3 behind the rear seat 2, and a tailgate 4 that provides access to the baggage space 3 from behind the car.

The front seat 1 has a backrest 11 and a seat cushion 12. The rear seat 2 has a backrest 21 and a seat cushion 22. The seat cushion 22 is pivotally connected to a horizontal pivot shaft 23 at the bottom surface of the seat cushion 24 in the vicinity of the front edge of said cushion, so as to enable the seat cushion 22 to be raised about the horizontal shaft 23 to the general vertical position indicated at 22', in which the underside 24' of the cushion faces rearwardly. The backrest 21 can then be dropped forwards about a horizontal pivot means 27 provided at the bottom edge of the backrest 21, so as to bring the rear side 28 of the backrest to a horizontal position, normally to a position in which it lies flush with the floor 31 of the baggage space 3. The load containment barrier 5 shall be mounted immediately behind the backrest 21 of the rear seat 2 when the rear seat 2 is arranged for passenger transport.

Figure 2:
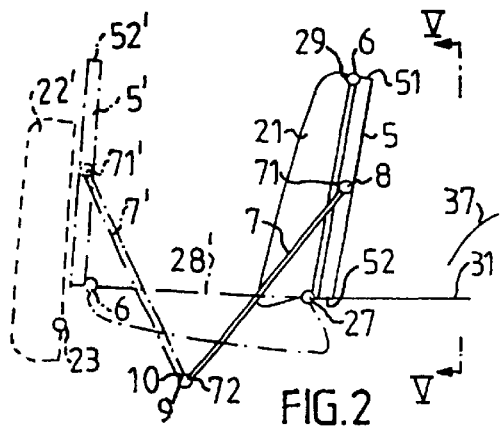
FIG. 2 is a schematic illustration of the invention as applied in the FIG. 1 illustration.

FIG. 2 illustrates the inventive concept:

The barrier 5 is positioned behind the backrest 21 and is connected to the upper edge 29 of said backrest by means of a horizontal pivot bearing 6 which extends transversely to the longitudinal direction of the vehicle. One (the upper) edge part 51 of the barrier 5 is shown connected to the pivot means 6, while the other end-part 52 of the barrier is shown resting against the floor 31.

A rod 7 is located at one side-edge of the backrest 21. One end 71 of the rod 7 is connected to the barrier 5 by means of a horizontal pivot means 8 at a position between the ends 51, 52 of said barrier, preferably about midway between said ends 51, 52. The other end 72 of the rod 7 is connected to a fixed point 9 in the car, by means of a pivot or hinge means 10 so that the rod can be swung forwardly/rearwardly in the car. The pivot means 10 is located generally on the floor 32 of the passenger space and midway between the respective, upstanding backrests 11, 21 of the front seating 1 and the rear seating 2, as seen in the longitudinal direction of the car.

When the backrest 21 is folded forwards about its pivot means 27, the barrier edge 51 will lie adjacent the baggage space extension floor 28, which may lie flush with the baggage space floor 31, wherewith the rod 7 ensures that the barrier 5 will take a vertical position with the edge 52 situated uppermost immediately behind the raised seat 22'.

The rod 7, the barrier 5, the backrest 21 and their pivot means 6, 8, 9, 27 (of which two, possibly 9 and 27, are stationary) thus form a mechanism that includes three link arms and four pivots.

A rod 7 may, of course, be connected to each side edge of the barrier 5. When the barrier 5 is divided into two parts (see FIG. 3), these parts can be locked together with the aid of a catch means 81. The barrier 5 is also suitably provided with attachments 93 in the proximity of its edge 52, for connection to the rear seat safety harnesses or belts.

When the barrier 5 is divided into two or more parts, the dividing line where the parts meet will suitably be aligned with a corresponding dividing line formed between corresponding parts of the backrest 21 of the rear seat. Because the placement of the dividing line between the backrest parts is normally offset laterally in relation to the gap 19 between the front seats 14, the gap 19 will advantageously be screened by the broader part of the barrier 5.

The link arms need not take-up forces that are transmitted to the barrier, but can be designed to solely control barrier movement between its aforementioned end positions. The forces acting on the barrier may, instead, be taken up with the aid of the rear seat safety belts, which can be coupled to the upper edge part of the barrier when said barrier is in its forward end position. Furthermore, each barrier part may be provided midway and in the proximity of respective side edges with a through-passing opening for receiving a belt or a line. Assuming that the barrier is in its forward end position, the two ends of the belt can be anchored in the baggage space 3 at the side and/or in the floor of said baggage space, wherewith the ends of the belt extend parallel from the anchoring points to respective openings and through said openings, and wherein the longitudinal centre part of the belt lies on the front side of the load-bearing plates of the barrier when the barrier is in its forward end position. The belt is suitably arranged to run freely through respective openings.

Figure 3:
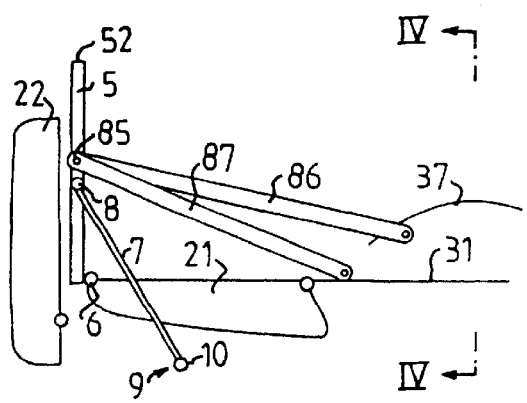
FIG. 3 illustrates anchoring straps which take-up forces that act forwardly against the barrier.
Figure 4:
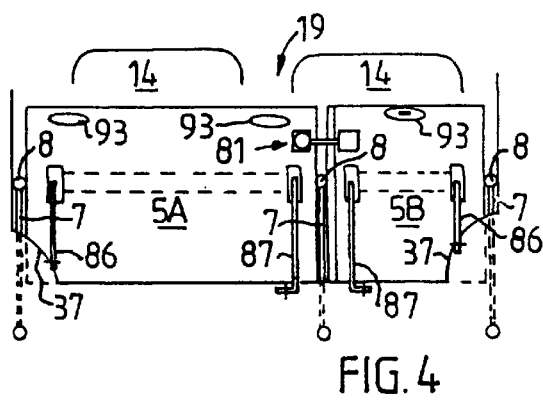
FIG. 4 is a view taken on the line IV—IV in FIG. 3.
Figure 5:
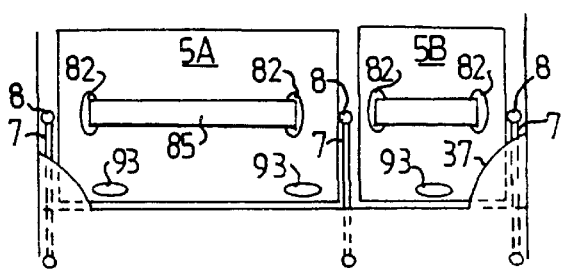
FIG. 5 is a view taken on the line V—V in FIG. 2.

A link mechanism may also be provided on the right side of the broader barrier part 4, as seen in FIG. 3. In the FIG. 3 illustration, this right barrier part has only one attachment 93 in the longitudinal centre region of the bottom edge, for coaction with the adjacent right safety belt.

In the FIG. 3 illustration, the left, broader barrier part has at the left end of its bottom edge an attachment 93 for the left rear seat belt and includes at the right end of its bottom edge a further attachment 93 for the rear seat lap belt.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A load containment arrangement for a car that has a rear seat and a baggage space area located behind the rear seat, said arrangement comprising:
    a load containment barrier connected to an upper edge of the backrest of the rear seat through a first pivot or hinge element that has a horizontal axle which extends transversely to a longitudinal direction of the car;
    a link arm connected at a first end to the barrier with a second pivot or hinge element positioned between upper and lower edges of the barrier, and connected at a second end to a fixed point in the car at a third pivot or hinge element positioned between upstanding backrests of respective front and rear seats;
    said barrier being forcibly movable from an upright position behind the rear seat backrest to a forward position at a forward end of the baggage space area through action of the link arm when the rear seat backrest is folded forwardly and downwardly.

2. The load containment arrangement as set forth in claim 1, wherein said rear seat includes two parts, each part having an associated barrier part of substantially a same width as a respective rear seat part, each barrier part having a respective link arm attached thereto for moving said barrier part back and forth from said upright position to said forward position.

3. The load containment arrangement as set forth in claim 1, wherein each barrier side edge is provided with a link arm and associated pivot elements, each link arm located alongside an adjacent side of the car.

4. The load containment arrangement as set forth in claim 1, wherein said forward position is behind an undersurface of a rear seat cushion of said rear seat when said cushion is folded upwardly.

5. The load containment arrangement as set forth in claim 1, wherein, when said barrier is in said forward position, an upper edge part of said barrier includes at least one attachment element to which a car safety belt can be connected.

6. The load containment arrangement as set forth in claim 1, wherein said barrier includes a tension-force absorbing, flexible element extending rearwardly from a point located approximately midway between the upper and lower edges of said barrier when said barrier is in said forward position, to a fixed point on a chassis of said car.

7. The load containment arrangement as set forth in claim 6, wherein both ends of said flexible element are fixed on said chassis and extend freely through associated openings at side edges of said barrier, a longitudinal center part of said flexible element extending between said openings on a front side of said barrier when said barrier is located in said forward position.

8. A load containment arrangement for a car that has a rear seat with a backrest and a seat cushion, and a baggage space area located behind the rear seat, said arrangement comprising:
    a load containment barrier pivotally connected to an upper edge of the backrest of the rear seat;
    a link arm pivotally connected at a first end to the barrier between upper and lower edges thereof, and pivotally connected at a second end to a point in the car;
    said barrier being movable from an upright position behind the rear seat backrest to a forward position at a forward end of the baggage space area through action of the link arm when the rear seat backrest is folded forwardly and downwardly.

9. The load containment arrangement as set forth in claim 8, wherein said rear seat is divided into two parts, each part having an associated barrier part which has a respective link arm attached thereto for moving said barrier part back and forth from said upright position to said forward position.

10. The load containment arrangement as set forth in claim 8, wherein said forward position is behind an undersurface of said rear seat cushion when folded upwardly into a raised position.

11. The load containment arrangement as set forth in claim 8, wherein, when said barrier is in said forward position, an upper edge part of said barrier includes at least one attachment element to which a car safety belt can be connected.

12. The load containment arrangement as set forth in claim 8, wherein said barrier includes a tension-force absorbing, flexible element extending rearwardly from a point located on said barrier when said barrier is in said forward position, to a fixed point on said car.

13. The load containment arrangement as set forth in claim 12, wherein both ends of said flexible element are fixed to said car and extend through associated openings at side edges of said barrier, a longitudinal center part of said flexible element extending between said openings on a front side of said barrier when said barrier is located in said forward position.

14. A load containment arrangement for a car that has a rear seat and a baggage space area located behind the rear seat, said arrangement comprising:
 a barrier having first and second substantially parallel edges;
 a first pivot element connecting said first edge to a backrest of the rear seat adjacent an upper edge thereof, said first edge being uppermost with respect to said second edge when said barrier is in a substantially upright position behind the rearseat backrest;
 a link arm connected at a first end to said barrier through a second pivot element, and connected at a second end to a point in the car through a third pivot element;
 said barrier movable from said upright position behind the rear seat backrest to a forward position at a forward end of the baggage space area through pivoting action of the first, second and third pivot elements when the rear seat backrest is folded forwardly and downwardly, said first and second pivot elements enabling said second edge to be uppermost with respect to said first edge when said barrier is in said forward position.

15. The load containment arrangement as set forth in claim 14, wherein said barrier is divided into two parts, each part having a respective link arm attached thereto for moving said barrier part back and forth from said upright position to said forward position.

16. The load containment arrangement as set forth in claim 14, wherein said forward position is behind an undersurface of a rear seat cushion of said rear seat when said cushion is folded upwardly.

17. The load containment arrangement as set forth in claim 14, wherein, when said barrier is in said forward position, said second edge includes at least one attachment element to which a car safety belt can be connected.

18. The load containment arrangement as set forth in claim 14, wherein said barrier includes a tension-force absorbing, flexible element extending rearwardly from said barrier to a fixed point on said car.

19. The load containment arrangement as set forth in claim 18, wherein both ends of said flexible element are fixed to said car and extend through associated openings at side edges of said barrier, a longitudinal center part of said flexible element extending between said openings on a front side of said barrier when said barrier is located in said forward position.

\* \* \* \* \*